(12) United States Patent
Li et al.

(10) Patent No.: US 6,798,380 B2
(45) Date of Patent: Sep. 28, 2004

(54) ROBUST CAPON BEAMFORMING

(75) Inventors: Jian Li, Gainesville, FL (US); Petre Stoica, Uppsala (SE); Zhisong Wang, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 10/358,597

(22) Filed: Feb. 5, 2003

(65) Prior Publication Data

US 2004/0150558 A1 Aug. 5, 2004

(51) Int. Cl.[7] .............................. H01Q 3/26; G01S 3/80
(52) U.S. Cl. ...................................... 342/368; 367/119
(58) Field of Search ................................ 342/368–377; 367/119–123; 600/437–461; 128/915, 916

(56) References Cited

U.S. PATENT DOCUMENTS 6,482,160 B1    11/2002    Stergiopoulos et al.

OTHER PUBLICATIONS

A.B. Gershman et al., Matrix fitting approach to direction of arrival estimation with imperfect spatial coherence of wavefronts, IEEE Transactions on Signal Processing, vol. 45(7), p. 1894–1899, Jul. 1997.*
G.R. Benitz, High–Definition Imaging, Lincoln Laboratory Journal, vol. 10(2), 1997.*
S. Shahbazpanahi et al., Parametric localization of multiple incoherently distributed sources using covariance fitting, Sensor Array and Multichannel Signal Processing Workshop Proceedings, p. 332–336, Aug. 2002.*
P. Stoica et al., Robust Capon beamforming, Conference Record of the Thirty–Sixth Asilomar Conference on Signals, Systems and Computers, vol. 1, p. 876–880, Nov. 2002.*
L. Jian et al., On robust capon beamforming and diagonal loading, Proceedings of the IEEE International Conference on Acoustics, Speech, and Signal Processing, vol. 5, p. V–337 to V–340, 2003.*
P. Stoica et al., Robust Capon beamforming, IEEE Signal Processing Letters, vol. 10(6), p. 172–175, Jun. 2003.*
L. Jian et al., On robust Capon beamforming and diagonal loading, IEEE Transactions on Signal Processing, vol. 51(7), p. 1702–1715, Jul. 2003.*
Marzetta, T., "A New Interpretation for Capon's Maximum Likelihood Method of Frequency–Wavenumber Spectral Estimation," IEEE Transactions on Acoustics, Speech, and Signal Processing. 31:445–449, 1983.
Chen et al., "Source Localization and Beamforming," IEEE Signal Processing Magazine, 2002.
Lorenz et al., "Robust Minimum Variance Beamforming," Information Systems Laboratory, Stanford University, Oct. 2001.
University of Florida, "Research Results," http://www.sa-l.ufl.edu/Research.htm, Nov. 11, 2002.
MIT Lincoln Laboratory, "High–Definition Vector Imaging," http://www.II.mit.edu/news/journal/10_2.html.
"Capon Beamforming Spectra with Pressure and Vector Sensors," http://www.ece.uic.edu/~nehorai/AVS.html, Nov. 11, 2002.

* cited by examiner

Primary Examiner—Gregory C. Issing
Assistant Examiner—Fred H Mull
(74) Attorney, Agent, or Firm—Akerman Senterfitt

(57) ABSTRACT

A method for enhanced Capon beamforming, referred to herein as an advanced robust Capon beamformer (advanced RCB), includes the steps of providing a sensor array including a plurality of sensor elements, wherein an array steering vector corresponding to a signal of interest (SOI) is unknown. The array steering vector is represented by an ellipsoidal uncertainty set. A covariance fitting relation for the array steering vector is bounded with the uncertainty ellipsoid. The matrix fitting relation is solved to provide an estimate of the array steering vector.

10 Claims, 10 Drawing Sheets

ROBUST CAPON BEAMFORMING

STATEMENT REGARDING FEDERALLY SPONSORED RESEARCH OR DEVELOPMENT

The United States Government has rights in this invention pursuant to National Science Foundation grants CCR-0104887 and ECS-0097636 to the University of Florida.

CROSS-REFERENCE TO RELATED APPLICATIONS

Not applicable.

FIELD OF THE INVENTION

The invention relates to Capon beamforming, and more specifically to an advanced Capon beamforming method and apparatus which provides computational efficiency and power estimates for signals of interest which can be adjusted for steering vector uncertainty.

BACKGROUND

Beamforming is a ubiquitous task in array signal processing, such as for radar, sonar, acoustics, astronomy, seismology, communications, and medical imaging. The standard data-independent beamformers include the delay-and-sum approach as well as methods based on various data-independent weight vectors for sidelobe control. The data-dependent Capon beamformer adaptively selects the respective weight vectors to minimize the array output power subject to the linear constraint that the signal of interest (SOI) does not suffer from any distortion (unity gain and no phase shift).

The Capon beamformer has better resolution and better interference rejection capability as compared to the data-independent beamformer, provided that the array steering vector corresponding to the SOI is accurately known. However, in practice the SOI steering vector is assumed, rather than being accurately known. This results in steering vector error. Steering vector error generally occurs because of differences between the assumed SOI arrival angle and the true SOI arrival angle and between the assumed array response and the true array response, such as due to array calibration errors. Whenever the SOI steering vector error becomes significant, the performance of the Capon beamformer can become worse than standard beamformers.

Many approaches have been proposed during the past three decades to improve the robustness of the Capon beamformer. To account for array steering vector errors, additional linear constraints, including point and derivative constraints, can be imposed. However, these constraints are not explicitly related to the uncertainty of the array steering vector. Moreover, for every additional linear constraint imposed, the beamformer loses one degree of freedom (DOF) for interference suppression. It has been shown that these constraints belong to the class of covariance matrix tapering approaches.

Diagonal loading (including its extended versions) has been a popular approach to improve the robustness of the Capon beamformer. The diagonal loading approaches are derived by imposing an additional quadratic constraint either on the Euclidean norm of the weight vector itself, or on its difference from a desired weight vector. Sometimes diagonal loading is also proposed to alleviate various problems of using the array sample co-variance matrix and to better control the peak sidelobe responses. However, for most of these methods, it is not clear how to choose the diagonal loading based on the uncertainty of the array steering vector.

The subspace based adaptive beamforming methods require the knowledge of the noise covariance matrix. Hence they are sensitive to the imprecise knowledge of the noise covariance matrix in addition to the array steering vector error. Making these methods robust against the array steering vector error will not cure their sensitivity to imprecise knowledge of the noise covariance matrix.

Most of the early suggested modified Capon beamforming algorithms are rather ad hoc in that the choice of parameters is not directly related to the uncertainty of the steering vector. Only recently have some Capon beamforming methods with a clear theoretical background been proposed, which, unlike the early methods, make explicit use of an uncertainty set of the array steering vector. However, even Capon methods which make explicit use of an uncertainty set of the array steering vector are computationally inefficient and cannot generally provide accurate power estimates for signals of interest.

SUMMARY OF THE INVENTION

A method for enhanced Capon beamforming, referred to herein as an advanced robust Capon beamformer (advanced RCB), includes the steps of providing a sensor array including a plurality of sensor elements, wherein an array steering vector corresponding to a signal of interest (SOI) is not precisely known. The array steering vector is represented by an ellipsoidal uncertainty set. A covariance fitting relation for the array steering vector is bounded with the uncertainty ellipsoid. The matrix fitting relation is then solved to provide an estimate of the array steering vector. The advanced RCB can be computed at a comparable computational cost with the conventional standard Capon beamformer (SCB), but is less sensitive to steering vector mismatches as compared to the SCB.

The method can further comprise the step of determining the power of the SOI, the power determining step including adjustment for the estimated array steering vector ($a_0$). From the SOI power, the direction of arrival of the SOI can also be determined. The method can be used to determine the weight vector for the sensor array. Using the weight vector, a waveform of the SOI can be determined.

The solving step can comprise use of the Lagrange Multiplier Method. The ellipsoidal set can be a flat ellipsoidal set. The sensor elements can comprise antennas or ultrasound transducers.

A sensor-based system includes a sensor array comprising a plurality of sensor elements, wherein an array steering vector corresponding to a signal of interest (SOI) is unknown. A signal processor is included, the signal processor representing the array steering vector with an ellipsoidal uncertainty set which bounds a covariance fitting relation for the array steering vector with the uncertainty ellipsoid, and solves the matrix fitting relation to provide an estimate of the array steering vector. The sensor system can comprise a radar, cellular communication, sonar or acoustic imaging system.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
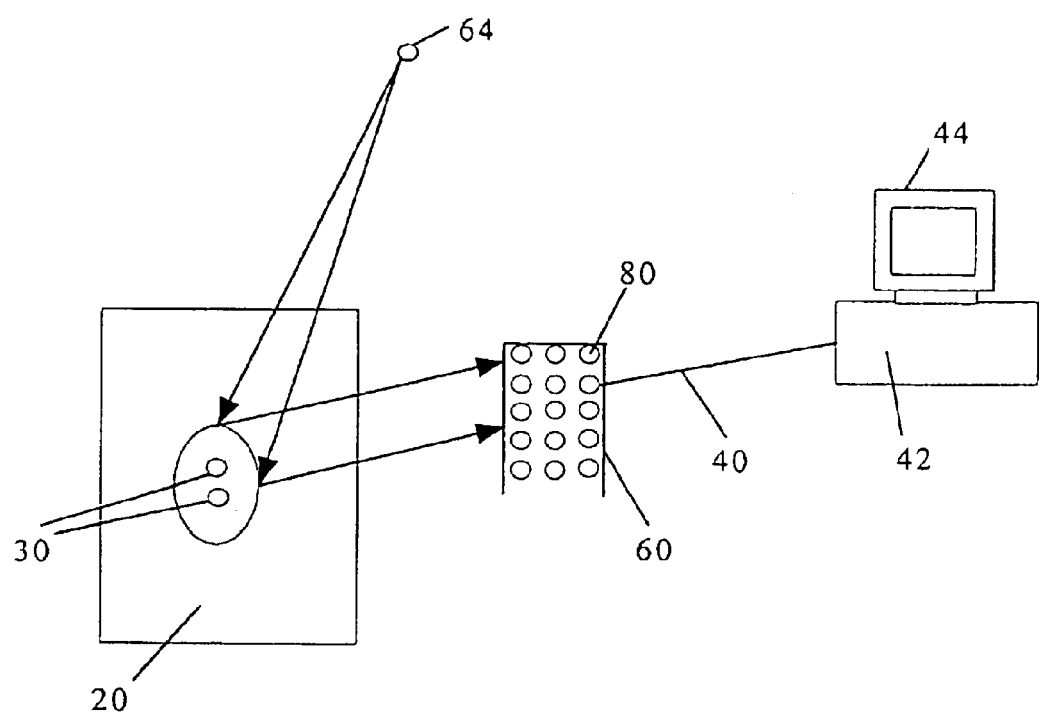
FIG. 1 is a diagram of an ultrasound imaging system which includes an advanced signal processor, according to an embodiment of the invention.

The invention describes improved Capon beamforming methods and systems. The inventive method is referred to herein as the advanced robust Capon beamformer (advanced RCB). The advanced RCB allows the Capon beamformer to account for uncertainty in the array steering vector which permits more accurate determination of the power of a signal of interest (SOI) as compared to other Capon methods, particularly when there is significant array steering vector uncertainty. In addition, the invention provides improved computational efficiency which can increase processing speed and reduce hardware cost over existing methods and beamforming based systems.

According to one embodiment of the invention the beamforming method includes the steps of providing a sensor array including a plurality of sensor elements, wherein an array steering vector corresponding to a signal of interest (SOI) is not precisely known. As used herein, an "unknown" steering vector refers to a condition where the array steering vector is at least not precisely known, and may not even be accurately known. The unknown array steering vector is represented with an ellipsoidal uncertainty set. A covariance fitting relation for the array steering vector is bounded with an uncertainty ellipsoid. The matrix fitting relation is then solved to provide an estimate of the array steering vector.

Although a paper by Lorenz et al. (R. G. Lorenz and S. P. Boyd, "Robust minimum variance beamforming," submitted to IEEE Transactions on Signal Processing, 2001; hereinafter "Lorenz" ) discloses coupling an SCB with an ellipsoidal uncertainty set, Lorenz couples the uncertainty set with the well-known SCB formulation (J. Capon, "High resolution frequency-wavenumber spectrum analysis," Proceedings of the IEEE, vol. 57, pp. 1408–1418, August 1969). Capon's method attempts to find weight vectors so that the SOI is not distorted and the overall array output power is minimized. The invention instead couples an ellipsoidal uncertainty set with a different and relatively unknown SCB formulation disclosed by Marzetta (T. L. Marzetta, "A new interpretation for Capon's maximum likelihood method of frequency-wavenumber spectrum estimation," IEEE Transactions on Acoustics, Speech, and Signal Processing, vol. 31, pp. 445–449, April, 1983; hereinafter "Marzetta"). Marzetta does not deal with a weight vector, but rather uses a covariance fitting criterion.

The invention and the method disclosed by Lorenz can provide the same SOI power estimate as the invention, but only when there is no steering vector uncertainty. However, the invention can be more easily extended to the case of the steering vector uncertainty than Lorenz's method because the advanced RCB directly provides the array steering vector, rather than the weight vector provided by Lorenz. In a simple analogy, if a radio receives a signal and it is desired to know the power of the signal, it is essential to know the amplification provided by the radio on the received signal; otherwise, there is ambiguity. The steering vector provided by the invention is analogous to the amplification provided by the radio. Accordingly, the advanced RCB provides a simple method of eliminating the scaling ambiguity when estimating the power of the SOI while the Lorenz method does not account for the scaling ambiguity problem. Thus, the invention is simpler and gives a more accurate power estimate of the SOI as compared to the method disclosed by Lorenz.

The advanced RCB can be efficiently computed using the Lagrange multiplier methodology. The advanced RCB belongs to the class of diagonal approaches and that the amount of diagonal loading can be precisely calculated based on the ellipsoidal uncertainty set of the array steering vector.

The invention is best understood by considering the beamforming problem. Consider an array comprising M sensors, such as antenna elements or transducers, and let R denote the theoretical covariance matrix of the array output vector. It is assumed that R>0 (positive definite) and has the following form:

$$R = \sigma_0^2 a_0 a_0^* + \sum_{k=1}^{K} \sigma_k^2 a_k a_k^* + Q \qquad (1)$$

where $$(\sigma_0^2, \{\sigma_k^2\}_{k=1}^K)$$

are the powers of the (K+1) uncorrelated signals impinging on the array, $$(a_0, \{a_k\}_{k=1}^K)$$

are the so-called steering vectors that are functions of the location parameters of the sources emitting the signals (e.g., their directions of arrival (DOAs)), $(\cdot)^*$ denotes the conjugate transpose, and Q is the noise covariance matrix (the "noise" comprises non-directional signals, and hence Q usually has full rank as opposed to the other terms in (1) whose rank is equal to one). In what follows we assume that the first term in (1) corresponds to the SOI and the remaining rank-one terms to K interferences. To avoid ambiguities, it is assumed that $$\|a_0\|^2 = M \tag{2}$$

where $\|\cdot\|$ denotes the Euclidean norm. It is noted that the above-expression for R holds for both narrowband and wideband signals; in the former case R is the covariance matrix at the center frequency, in the latter R is the covariance matrix at the center of a given frequency bin. In practical applications, R is replaced by the sample covariance matrix $\hat{R}$, where $$\hat{R} = \frac{1}{N} \sum_{n=1}^{N} x_n x_n^* \tag{3}$$

with N denoting the number of snapshots of data and $x_n$ representing the nth snapshot.

The robust beamforming problem solved by the invention can be briefly stated as extending the Capon beamformer so as to be able to accurately determine the power of SOI even when only an imprecise knowledge of its steering vector, $a_0$, is available. More specifically, it is assumed that the only knowledge about $a_0$ is that it belongs to the following uncertainty ellipsoid:

$$[a_0 - \bar{a}]^* C^{-1} [a_0 - \bar{a}] \leq 1 \tag{4}$$

where $\bar{a}$ and C (a positive definite matrix) are given. Although this specification primarily addresses SOI power estimation, the advanced RCB is also described as being capable of estimating the signal waveform, weight vector, and direction of arrival (DOA) of the SOI.

The common formulation of the beamforming problem that leads to the SCB is as follows:

(a) Determine the M×1 vector $w_0$ that is the solution to the following linearly constrained quadratic problem:

$$\min_w w^* R w \text{ subject to } w^* a_0 = 1 \tag{5}$$

(b) Use $w_0^* R w_0$ as an estimate of $\sigma_0^2$.

The solution to (5) is easily derived:

$$w_0 = \frac{R^{-1} a_0}{a_0^* R^{-1} a_0} \tag{6}$$

Using (6) in Step (b) above yields the following estimate of $\sigma_0^2$:

$$\hat{\sigma}_0^2 = \frac{1}{a_0^* R^{-1} a_0} \tag{7}$$

Non-Degenerate Ellipsoidal Uncertainty Set

To derive the advanced RCB, the Capon beamforming problem in Marzetta's method is reformulated by appending the uncertainty set in (4). Proceeding in this way a robust estimate of $\sigma_0^2$ is directly obtained, without any intermediate calculation of the vector w:

$$\max_{\sigma^2, a} \sigma^2 \text{ subject to } R - \sigma^2 a a^* \geq 0 \tag{8}$$

$$\text{for any } a \text{ satisfying } (a - \bar{a})^* C^{-1} (a - \bar{a}) \leq 1$$

(where $\bar{a}$ and C are given). Note that the first line above can be interpreted as a covariance fitting problem: given R and a, it is desired to determine the largest possible SOI term, $\sigma^2 a a^*$, that can be a part of R under the natural constraint that the residual covariance matrix be positive semidefinite. The RCB problem in (8) can be readily reformulated as a semi-definite program [P. Stoica, Z. Wang, and J. Li, "Robust Capon beamforming," IEEE Signal Processing Letters, to appear, hereafter referred to herein as Stoica], which requires $O(M^{6.5})$ flops if SeDuMi type of software [J. F. Sturm, "Using SeDuMi 1.02, a MATLAB toolbox for optimization over symmetric cones," Optimization Methods and Software, no. 11–12, pp. 625–653, August, 1999] is used to solve it. However, the approach presented below only requires $O(M^3)$ flops.

For any given a, the solution $\sigma_0^2$ to (8) is indeed given by the counterpart of (7) as shown by the following readily checked equivalences (here $R^{-1/2}$ is the Hermitian square root of $R^-$):

$$R - \sigma^2 a a^* \geq 0 \Leftrightarrow \tag{9}$$

$$I - \sigma^2 R^{-1/2} a a^* R^{-1/2} \geq 0 \Leftrightarrow$$

$$1 - \sigma^2 a^* R^{-1} a \geq 0 \Leftrightarrow$$

$$\sigma^2 \leq \frac{1}{a^* R^{-1} a} = \hat{\sigma}_0^2$$

Hence (8) can be reduced to the following problem $$\min_a a^* R^{-1} a \text{ subject to } (a - \bar{a}) * C^{-1} (a - \bar{a}) \leq 1 \tag{10}$$

Note that any matrix C>0 can be decomposed in the form $$C^{-1} = \frac{1}{\varepsilon} D^* D \tag{11}$$

where for some $\varepsilon > 0$, $$D = \sqrt{\varepsilon} C^{-1/2} \tag{12}$$

Let $$\breve{a}=Da, \bar{\breve{a}}=D\bar{a}, \breve{R}=DRD^* \quad (13)$$

Then (10) becomes $$\min_{\breve{a}} \breve{a}*\breve{R}^{-1}\breve{a} \text{ subject to } \left\|\breve{a}-\bar{\breve{a}}\right\|^2 \le \varepsilon \quad (14)$$

Then (10) becomes (14). Without a loss of generality, (10) will be next solved for $C=\varepsilon I$, i.e., solving the following quadratic optimization problem under a spherical constraint:

$$\min_{a} a*R^{-1}a \text{ subject to } \|a-\bar{a}\|^2 \le \varepsilon \quad (15)$$

To exclude the trivial solution a=0 to (15), it is assumed that $$\|\bar{a}\|^2 > \varepsilon \quad (16)$$

Because the solution to (15) (under (16)) will evidently occur on the boundary of the constraint set, (15) can be re-formulated as the following quadratic problem with a quadratic equality constraint:

$$\min_{a} a*R^{-1}a \text{ subject to } \|a-\bar{a}\|^2 - \varepsilon \quad (17)$$

This problem can be solved by using the Lagrange multiplier methodology, which is based on the function:

$$f = a*R^{-1}a + \lambda(\|a-\bar{a}\|^2 - \varepsilon) \quad (18)$$

where $\lambda \ge 0$ is the Lagrange multiplier. Differentiation of (18) with respect to a gives the optimal solution $\hat{a}_0$:

$$R^{-1}\hat{a}_0 + \lambda(\hat{a}_0 - \bar{a}) = 0 \quad (19)$$

The above equation yields $$\hat{a}_0 = \left(\frac{R^{-1}}{\lambda} + I\right)^{-1} \bar{a} \quad (20)$$

$$= \bar{a} - (I+\lambda R)^{-1}\bar{a} \quad (21)$$

where the well-known matrix inversion lemma is used to obtain the second equality. The Lagrange multiplier $\lambda \ge 0$ is obtained as the solution to the constraint equation:

$$g(\lambda) \triangleq \|(I+\lambda R)^{-1}\bar{a}\|^2 = \varepsilon \quad (22)$$

Let $$R = U\Gamma U^* \quad (23)$$

where the columns of U contain the eigenvectors of R and the diagonal elements of the diagonal matrix $\Gamma$, $\gamma_1 \ge \gamma_2 \ge \ldots \ge \gamma_M$, are the corresponding eigenvalues. Let $$z = U^*\bar{a} \quad (24)$$

and let $z_m$ denote the mth element of z. Then (22) can be written as $$g(\lambda) = \sum_{m=1}^{M} \frac{|z_m|^2}{(1+\lambda\gamma_m)^2} = \varepsilon \quad (25)$$

Note that $g(\lambda)$ is a monotonically decreasing function of $\lambda \ge 0$. According to (16) and (22), $g(0) > \varepsilon$ and hence $\lambda \ne 0$. From (25), it is clear that $\lim_{\lambda \to \infty} g(\lambda) = 0 < \varepsilon$. Hence there is a unique solution $\lambda > 0$ to (25). By replacing the $\gamma_m$ in (25) with $\gamma_M$ and $\gamma_1$, respectively, the following tighter upper and lower bounds on the solution $\lambda > 0$ to (25) can be obtained:

$$\frac{\|\bar{a}\| - \sqrt{\varepsilon}}{\gamma_1\sqrt{\varepsilon}} \le \lambda \le \frac{\|\bar{a}\| - \sqrt{\varepsilon}}{\gamma_M\sqrt{\varepsilon}} \quad (26)$$

By dropping the 1 in the denominator of (25), another upper bound on the solution $\lambda$ to (25) is obtained:

$$\lambda < \left(\frac{1}{\varepsilon}\sum_{m=1}^{M} \frac{|z_m|^2}{\gamma_m^2}\right)^{\frac{1}{2}} \quad (27)$$

The upper bound in (27) is usually tighter than the upper bound in (26) but not always. Summing up all these facts shows that the solution $\lambda > 0$ to (25) is unique and it belongs to the following interval:

$$\frac{\|\bar{a}\| - \sqrt{\varepsilon}}{\gamma_1\sqrt{\varepsilon}} \le \lambda \le \min\left\{\left(\frac{1}{\varepsilon}\sum_{m=1}^{M} \frac{|z_m|^2}{\gamma_m^2}\right)^{1/2}, \frac{\|\bar{a}\| - \sqrt{\varepsilon}}{\gamma_M\sqrt{\varepsilon}}\right\} \quad (28)$$

Once the Lagrange multiplier $\lambda$ is determined, $\hat{a}_0$, is determined by using (21) and $\hat{\sigma}_0^2$ is computed by using (9) with a replaced by $\hat{a}_0$. Hence the major computational demand of the invention comes from the eigendecomposition of the Hermitian matrix R, which requires $O(M^3)$ flops. Therefore, the computational complexity of the invention is comparable to that of the standard SCB.

Both the power and the steering vector of SOI are treated as unknowns in the advanced RCB (see (8)), and hence that there is a "scaling ambiguity" in the SOI covariance term in the sense that $(\sigma^2, a)$ and $(\sigma^2/\alpha, \alpha^{1/2}a)$ (for any $\alpha > 0$) give the same term $\sigma^2 aa^*$. To eliminate this ambiguity, the knowledge that $\|a_0\|^2 = M$ is used (see (2)) and hence estimate $\sigma_0^2$ from Stoica as:

$$\hat{\hat{\sigma}}_0^2 = \hat{\sigma}_0^2 \|\hat{a}_0\|^2 / M \quad (29)$$

The numerical examples in Stoica confirm that $\hat{\hat{\sigma}}_0^2$ is a (much) more accurate estimate of $\sigma_0^2$ than $\hat{\sigma}_0^2$.

A method is now disclosed from an advanced RCB using a spherical constraint. The steps include the following:

Step 1: Compute the eigendecomposition of R (or more practically of $\hat{R}$).

Step 2: Solve (25) for $\lambda$, e.g., by a Newton's method, using the knowledge that the solution is unique and it belongs to the interval in (28).

Step 3: Use the $\lambda$ obtained in Step 2 to get $$\hat{a}_0 = \bar{a} - U(I+\lambda\Gamma)^{-1}U^*\bar{a} \quad (30)$$

where the inverse of the diagonal matrix $I+\lambda\Gamma$ is easily computed. (Note that (30) is obtained from (21)).

Step 4: Compute $\hat{\sigma}_0^2$ by using $$\hat{\sigma}_0^2 = \frac{1}{\bar{a}*U\Gamma(\lambda^{-2}I+2\lambda^{-1}\Gamma+\Gamma^2)^{-1}U*\bar{a}} \quad (31)$$

where the inverse $\lambda^{-2}I+2\lambda^{-1}\Gamma+\Gamma^2$ is also easily computed. Note that a in (9) is replaced by $\hat{\sigma}_0^2$ in (20) to obtain (31). Then use the $\hat{\sigma}_0^2$ in (29) to obtain the estimate of $\sigma_0^2$.

In all of the steps above, it is not needed to have $\gamma_m>0$ for all $m=1, 2, \ldots, M$. Hence R or $\hat{R}$ can be singular, which means that N<M can be used to compute $\hat{R}$.

Unlike the invention, Lorenz does not provide any direct estimate $\hat{a}_0$. Hence, Lorenz does not disclose of a simple way (such as (29) above) to eliminate the scaling ambiguity of the SOI power estimation that is likely a problem for all robust beamforming approaches. In fact, this problem is entirely ignored by Lorenz. Note that accurate SOI power estimation is essential in many applications, including radar, sonar, and acoustic imaging.

In other applications, such as communications, the focus is generally on SOI waveform estimation. Let $s_0(n)$ denote the waveform of the SOI. Once the SOI steering vector is estimated with the advanced RCB, $s_0(n)$ can be estimated as in the SCB as follows:

$$\hat{s}_0(n)=\hat{w}^*_0 x_n \quad (32)$$

where $\hat{a}_0$ in (20) is used to replace $a_0$ in (6) to obtain $\hat{w}_0$:

$$\hat{w}_0 = \frac{R^{-1}\hat{a}_0}{\hat{a}_0^* R^{-1} \hat{a}_0} \quad (33)$$

$$= \frac{\left(R+\frac{1}{\lambda}I\right)^{-1}\bar{a}}{\bar{a}*\left(R+\frac{1}{\lambda}I\right)^{-1}R\left(R+\frac{1}{\lambda}I\right)^{-1}\bar{a}} \quad (34)$$

Note that the advanced RCB weight vector has the form of diagonal loading except for the real-valued scaling factor in the denominator of (34). However, the scaling factor is not significant since the quality of the SOI waveform estimate is typically expressed by the signal-to-interference-plus-noise ration (SINR)

$$SINR = \frac{\sigma_0^2|\hat{w}_0^* a_0|^2}{\hat{w}_0^*\left(\sum_{k=1}^{K}\sigma_k^2 a_k a_k^* + Q\right)\hat{w}_0} \quad (35)$$

which is independent of the scaling of the weight vector.

When C is not a scaled identity matrix, the diagonal loading is added to the weighted matrix $\check{R}$ defined in (13) and is referred to herein as extended diagonal loading. To exclude the trivial solution a=0 to (8), it is now assumed, like in (16), that $$\|\bar{a}\|^2 > \varepsilon \quad (36)$$

which is equivalent to $$\bar{a}*C^{-1}\bar{a}>1 \quad (37)$$

The advanced RCB approach herein belongs to the class of (extended) diagonally loaded Capon beamforming approaches. However, unlike earlier approaches, the invention can be used to determine exactly the optimal amount of diagonal loading needed for a given ellipsoidal uncertainty set of the steering vector, at a very modest computational cost.

The approach of the invention is different from recent RCB approaches such as Lorenz. Lorenz extended Step (a) of SCB to take into account the fact that when there is uncertainty in $a_0$, the constraint in $w^*a_0$ in (6) should be replaced with a constraint on $w^*a$ for any vector a in the uncertainty set, then the so-obtained w is used in $w^*Rw$ to derive an estimate of $\sigma_0^2$, as in Step (b) of SCB. Despite the apparent differences in formulation, it can be proven that the RCB according to the invention gives the same weight vector as the RCB presented in Lorenz, yet the advanced RCB is computationally more efficient in calculating the diagonal loading level. The advanced RCB approach searches a monotonically decreasing function, which is significantly easier than searching a more complex function as required in the method disclosed by Lorenz.

Moreover, the advanced RCB can be readily modified for recursive implementation by adding a new snapshot of $\hat{R}$ and possibly deleting an old one. By using a recursive eigendecomposition updating method (see, for example, [Y. Hua, M. Nikpour, and P. Stoica, "Optimal reduced-rank estimation and filtering," IEEE Transaction on Signal Processing, vol. 49, pp. 457–469, March, 2001] and the references therein) with the inventive RCB, the power and waveform estimates can be updated in $O(M^2)$ flops. Lorenz can be implemented recursively by updating the eigendecomposition similarly to described herein. However, the total computational burden is higher for Lorenz than for the inventive RCB, as explained in the next subsection.

Flat Ellipsoidal Uncertainty

When the uncertainty set for a is a flat ellipsoid which makes the uncertainty set as tight as possible (assuming that the available a priori information allows that); (8) becomes $$\max_{\sigma^2,a}\sigma^2 \text{ subject to } R - \sigma^2 aa* \geq 0 \quad (38)$$

$$a = Bu + \bar{a}, \|u\| \leq 1$$

where B is an M×L matrix (L<M) with full column rank and u is an L×1 vector. (When L=M, (38) becomes (4) with C=BB*.) Below a separate treatment of the case of L<M due to the differences from the case of L=M in the possible values of the Lagrange multipliers and the detailed computational steps are provided. The RCB optimization problem in (38) can be reduced to (see (10)):

$$\min_{u}(Bu+\bar{a})*R^{-1}(Bu+\bar{a}) \text{ subject to } \|u\| \leq 1 \quad (39)$$

Note that $$(Bu+\bar{a})*R^{-1}(Bu+\bar{a})=u*B*R^{-1}Bu+\bar{a}*R^{-1}Bu+u*B*R^{-1}\bar{a}+\bar{a}*R^{-1}\bar{a} \quad (40)$$

Let $$\check{R}=B*R^{-1}B>0 \quad (41)$$

and $$\check{\bar{a}}=B*R^{-1}\bar{a} \quad (42)$$

Using (40)–(42) in (39) gives $$\min_{u} u*\check{R}u + \bar{\tilde{a}}*u + u*\bar{\tilde{a}} \text{ subject to } \|u\| \le 1 \quad (43)$$

To avoid the trivial solution a=0 to the RCB problem in (38), the following condition is assumed. Let $\tilde{u}$ be the solution to the equation $$B\tilde{u} + \bar{a} = 0 \quad (44)$$

Hence $$\tilde{u} = -B^{\dagger}\bar{a} \quad (45)$$

Then it is required that $$\bar{a}*B^{\dagger}*B^{\dagger}\bar{a} > 1 \quad (46)$$

where $B^{\dagger}$ denotes the Moore-Penrose pseudo-inverse of B.

The Lagrange multiplier methodology is based on the function [32]

$$\check{f} = u*\check{R}u + \bar{\tilde{a}}*u + u*\bar{\tilde{a}} + \lambda(u*u - 1) \quad (47)$$

where $\lambda \ge 0$ is the Lagrange multiplier. Differentiation of (47) with respect to u gives $$\check{R}\hat{u} + \bar{\tilde{a}} + \lambda\hat{u} = 0 \quad (48)$$

which yields $$\hat{u} = -(\check{R} + \lambda I)^{-1}\bar{\tilde{a}} \quad (49)$$

If $$\|\check{R}^{-1}\bar{\tilde{a}}\| \le 1,$$

then the unique solution in (49) with $\lambda = 0$, which is $$\hat{u} = -\check{R}^{-1}\bar{\tilde{a}},$$

solves (43).
If $$\|\check{R}^{-1}\bar{\tilde{a}}\| > 1,$$

then $\lambda > 0$ is determined by solving $$\check{g}(\lambda) \triangleq \|(\check{R} + \lambda I)^{-1}\bar{\tilde{a}}\|^2 = 1 \quad (50)$$

Note that $\check{g}(\lambda)$ is a monotonically decreasing function of $\lambda > 0$. Let $$\check{R} = \check{U}\check{\Gamma}\check{U}* \quad (51)$$

where the columns of $\check{U}$ contain eigenvectors of $\check{R}$ and the diagonal elements of the diagonal matrix $\Gamma$, $\check{\gamma}_1 \ge \check{\gamma}_2 \ge \ldots \ge \check{\gamma}_L$, are the corresponding eigenvalues. Let $$\check{z} = \check{U}*\bar{\tilde{a}} \quad (52)$$

and let $\check{z}_l$ denote the lth element of $\check{z}$. Then $$\check{g}(\check{\lambda}) = \sum_{i=1}^{L} \frac{|\check{z}_i|^2}{(\check{\gamma}_i + \check{\lambda})^2} = 1 \quad (53)$$

Note that $$\lim_{\check{\lambda} \to \infty} \check{g}(\check{\lambda}) = 0 \text{ and } \check{g}(0) = \|\check{R}^{-1}\bar{\tilde{a}}\| > 1.$$

Hence there is a unique solution to (53) between 0 and $\infty$. By replacing the $\check{\gamma}_1$ in (53) with $\check{\gamma}_L$ and $\check{\gamma}_1$ respectively, a tighter upper and lower bounds on the solution to (53) is obtained:

$$\|\bar{\tilde{a}}\| - \check{\gamma}_1 \le \check{\lambda} \le \|\bar{\tilde{a}}\| - \check{\gamma}_L \quad (54)$$

Hence the solution to (53) can be efficiently determined, e.g., by using the Newton's method, in the above interval. Then the solution $\lambda$ to (53) is used in (49) to obtain the $\hat{u}$ that solves (43).

To summarize, the advanced RCB approach consists of the following steps for the RCB with the flat ellipsoidal constraint:

Step 1: Compute the inverse of R (or more practically of $\hat{R}$) and calculate $\check{R}$ and $$\bar{\tilde{a}}$$

using (41) and (42), respectively.
Step 2: Compute the eigendecomposition of $\check{R}$ (see (51)).
Step 3: If $$\|\check{R}^{-1}\bar{\tilde{a}}\| \le 1,$$

then set $\lambda = 0$. If $$\|\check{R}^{-1}\bar{\tilde{a}}\| > 1,$$

then solve (53) for $\lambda$, e.g., by a Newton's method, using the knowledge that the solution is unique and it belongs to the interval in (54).
Step 4: Use the $\lambda$ obtained in Step 3 to get:

$$\hat{u} = -\check{U}(\Gamma + \lambda I)^{-1}\check{U}* + \bar{\tilde{a}} \quad (55)$$

(which is obtained from (49)). Then use the $\hat{u}$ to obtain the optimal solution to (38) as:

$$\hat{a}_0 = B\hat{u} + \bar{a} \quad (56)$$

Step 5: Compute $\hat{\sigma}_0^2$ by using (9) with a replaced by $\hat{a}_0$ and then use the as $\sigma_0^2$ in (29) to obtain the estimate of $\sigma_0^2$.

Hence, under the flat ellipsoidal constraint the complexity of the advanced RCB is also $O(M^3)$ flops, which is on the same order as for SCB and is mainly due to computing $R^{-1}$ and the eigendecomposition of $\check{R}$. If L<<M, then the complexity is mainly due to computing $R^{-1}$.

For applications such as SOI waveform estimation $\hat{w}_0$ is calculated (assuming $\lambda \neq 0$) as $$\hat{w}_0 = \frac{R^{-1}\hat{a}_0}{\hat{a}_0^* R^{-1} \hat{a}_0} \qquad (57)$$

$$= \frac{\left(R + \frac{1}{\lambda}BB^*\right)^{-1}\bar{a}}{\bar{a}*\left(R + \frac{1}{\lambda}BB^*\right)^{-1} R \left(R + \frac{1}{\lambda}BB^*\right)^{-1}\bar{a}}$$

To obtain (57) the following is used (also using (49) in (56)):

$$R^{-1}\hat{a}_0 = -R^{-1}B(\check{R} + \check{\lambda}I)^{-1}\bar{a} + R^{-1}\bar{a} \qquad (58)$$

$$= -R^{-1}B(B*R^{-1}B + \check{\lambda}I)^{-1}B*R^{-1}\bar{a} + R^{-1}\bar{a}$$

$$= \left(R + \frac{1}{\lambda}BB*\right)^{-1}\bar{a}$$

where the last equality follows from the matrix inversion lemma. Despite the differences in the formulation of the invention and Lorenz it can be shown that $\hat{w}_0$ in (57) and the optimal weight in Lorenz are identical. Note, however, that to compute $\lambda$, the advanced RCB needs $O(L^3)$ flops while the approach in Lorenz requires $O(M^3)$ flops (and $L \leq M$).

A wide variety of improved systems can be based on the invention. In the embodiment shown in FIG. 1, a 3D ultrasound imaging system 100 according to the invention is shown. An object 20 is irradiated by a source 64 which emits ultrasound. Structures 30 within the object 20 reflect the ultrasound waves in different directions. The reflected ultrasoind waves are captured by a plurality of discrete sensors 80 of 2D or 3D-sensor array 60. Output signals of the sensors 80 are transmitted via a suitable communication link to a processing unit 42 such as a conventional computer workstation for processing. Reconstructed images can then be displayed using display 44. High resolution images and compact design of the multidimensional sensor array 6 and the processing unit 12 are made possible using the advanced RCB process according to the present invention.

Improved adaptive array antennas based on the invention can be used in various mobile communication systems including base-mobile, indoor-mobile, satellite-mobile, and satellite-satellite communication systems. They can help improve the system performance by increasing channel capacity and spectrum efficiency, extending range coverage, tailoring beam shape and steering multiple beams to track a large plurality of mobile units. Furthermore, such systems can reduce multi-path fading, co-channel interference, system complexity and cost, as well as the bit error rate.

The invention can also be used for improved Global Positioning Systems (GPS). In GPS applications, the navigation signals transmitted from satellites generally have low power and very strong interferences may co-exist with the navigation signals. In addition, multi-path is introduced by the environment. Consequently, severe performance degradation may occur.

Adaptive arrays according to the invention can be used to achieve a high signal-to-interference-plus-noise ratio (SINR) and accordingly improve the positioning accuracy of GPS.

The invention can also be used for improved Quadrupole Resonance (QR) explosive detection and Magnetic Resonance Imaging (MRI). Improved adaptive arrays can also be used to obtain high-resolution images for the target detection and parameter estimation as well as interference suppression. Adaptive arrays can also be used to obtain more accurate power estimates of acoustic sources in the presence of interferences and noise within a reverberant environment.

The invention can also be used for improved radar and sonar. Regarding radar and sonar, very strong jammers and clutter may be present. Adaptive arrays according to the invention can be used to improve the SINR and obtain high-resolution imaging results.

The invention can also be used for improved speech enhancement. For example, in a conference room, the desired speech signal from the mouth of a talker may be corrupted by interfering signals such as other talkers :and room reverberation. By exploiting adaptive arrays based on the invention, a higher-quality speech signal can be obtained.

The invention can also be used for speech source localization and tracking. In this embodiment, improved adaptive arrays can be used to locate and track one or more speaking sources. The speaker location estimates can be employed to steer a camera or a series of cameras and frame the active speaker in a video-conference system.

The invention can be used for improved hearing aids. Adaptive arrays can be used to reduce the effect of background noise and interferences to significantly improve the speech understanding of the hearing impaired and to increase their overall satisfaction with the hearing aid device.

The invention also has applications with automobiles. For example, in many countries and regions hand-held telephony in cars is prohibited by legislation. The advantages of hand- free telephones in cars are safety and convenience. However, by installing the microphone far away from the user, poor sound quality and acoustic echoes may occur. Improved adaptive arrays according to the invention can be used in cars for improved speech enhancement, echo cancellation and reverberation suppression.

EXAMPLES

The present invention is further illustrated by the following examples which demonstrate the superior performance of the advanced RCB for SOI power estimation, imaging and other purposes. The examples are provided for illustration only and are not to be construed as limiting the scope or content of the invention in any way.

One motivation for studying the RCB problem was an acoustic imaging application in which the goal was to estimate the SOI power in the presence of strong interferences as well as some uncertainty in the SOI steering vector. In all of the examples considered below, a uniform linear array with M=10 sensors and half-wavelength sensor spacing is assumed.

The effect of the number of snapshots N on the SOI power estimate is considered when the sample covariance matrix $\hat{R}$ in (3) is used in lieu of the theoretical array covariance matrix R in both the SCB and advanced RCB. Whenever $\hat{R}$ is used instead of R, the average power estimates from 100 Monte-Carlo simulations are given. However, the beampatterns shown are obtained using $\hat{R}$ from one Monte-Carlo realization only. It is assumed that a spatially white Gaussian noise whose covariance matrix is given by Q=I. The power of SOI is $\sigma_0^2 = 10$ dB and the powers of the two (K=2) interferences assumed to be present are $\sigma_1^2 = \sigma_2^2 = 20$ dB. It is also assumed that the steering vector uncertainty is due to the uncertainty in the SOI's direction of arrival $\theta_0$. It is assumed that $a(\theta_0)$ belongs to the following uncertainty set:

$$\|a(\theta_0) - \bar{a}\|^2 \leq \epsilon; \bar{a} = a(\theta_0 + \Delta) \qquad (59)$$

where $\epsilon$ is a user defined parameter which determines the size of the ellipsoid. Let $\epsilon_0 = \|a(\theta_0) - \bar{a}\|^2$. Then choosing $\epsilon = \epsilon_0$ gives the smallest set that includes $a(\theta_0)$. However, since the steering vector uncertainty is unknown in practice, then the $\epsilon$ chosen may be greater or less than $\epsilon_0$. To show that the choice of $\epsilon$ is not critical for the advanced RCB, numerical results are presented for several values of $\epsilon$. It is first assumed that the SOI's direction of arrival is $\theta_0 = 0°$ and the directions of arrival of the interferences are $\theta_1 = 60°$ and $\theta_2 = 80°$.

In FIG. 2(a) and (b), plots of $\sigma_0^2$ and $\hat{\sigma}_0^2$ are shown versus the number of snapshots (N) for the no mismatch case, for $\epsilon = 0.5$ (small ellipsoid) and $\epsilon = 3.5$ (bigger ellipsoid), respectively to demonstrate that the choice of $\epsilon$ is not critical for the advanced RCB. The true SOI power was 10 dB. Without a mismatch, $\Delta = 0$ degrees (59) and consequently $\epsilon_0 = 0$. FIG. 2(a) and (b) each show that the SOI power estimates obtained by using $\hat{R}$ approach those computed via R as the number of snapshots (N) increases, and that the advanced RCB converges to the proper 10 dB power level much faster than the SCB. In contrast, the SCB is seen to require that N be greater than or equal to the number of array sensors M=10. However, the advanced RCB works well to accurately estimate the power of the SOI even when N is as small as N=2.

FIG. 3(a)–(d) illustrate the beampatterns for the SCB and advanced RCB using R as well as $\hat{R}$ with N=10, 100, and 8000 for the case shown in FIG. 2(b) (SOI power=10 dB; $\epsilon = 3.5$). Note that the weight vectors used to calculate the beampatterns of the advanced RCB in this example (as well as in the following examples) are obtained by using the scaled estimate of the array steering vector $\sqrt{M}\hat{a}_0/\|\hat{a}_0\|$ in (33) instead of $\hat{a}_0$. The vertical dotted lines in these Figures denote the directions of arrival of the SOI and the interferences. The horizontal dotted lines in the figure correspond to 0 dB. Note from FIG. 3(a) that although the advanced RCB beampatterns do not have nulls at the directions of arrival of the interferences as deep as those of the SCB, the interferences (whose powers are 20 dB) are sufficiently suppressed by the advanced RCB to not disturb the SOI power estimation. Regarding the poor performance of SCB for small N, it is noted that that the errors between $\hat{R}$ and R can be viewed as due to a steering vector error.

Figure 2:
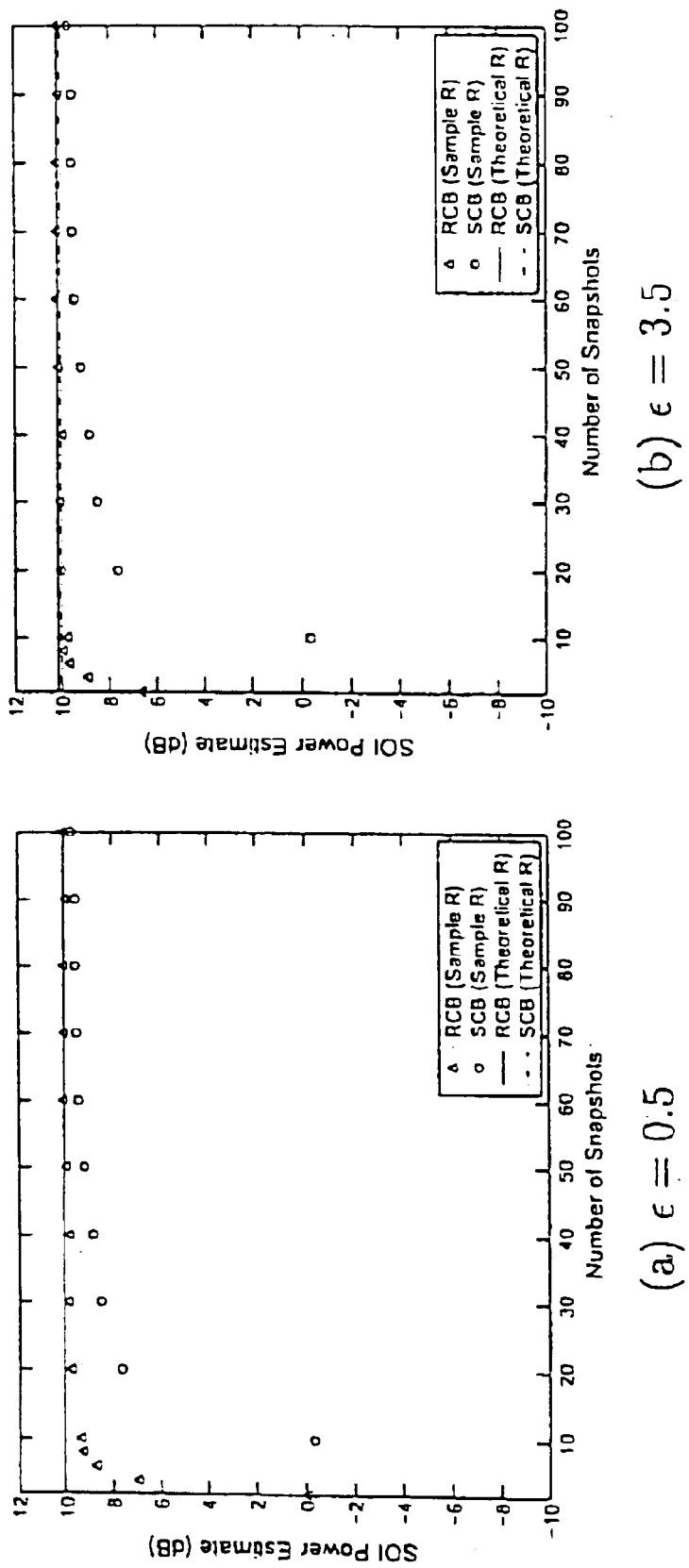
FIG. 2(a) and (b) are plots of $\sigma_0^2$ and $\hat{\sigma}_0^2$ for the advanced RCB and SCB using the theoretical array covariance R, as well as the estimated (sample) array covariance $\hat{R}$, versus the number of snapshots N for the no mismatch case for $\epsilon$=0.5 and $\epsilon$=3.5, respectively.
Figure 3:
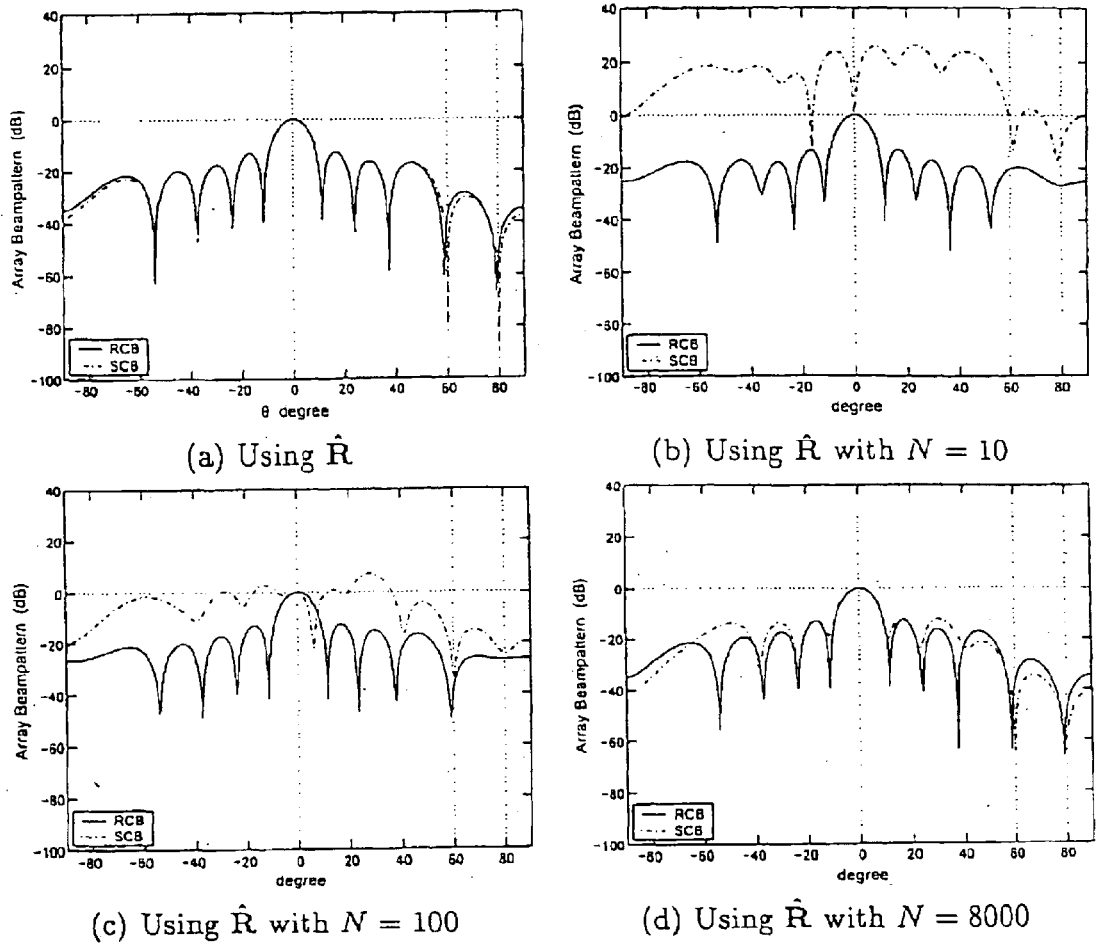
FIG. 3(a)–(d) illustrate the beampatterns of the SCB and advanced RCB using R, as well as $\hat{R}$ with N=10, 100, and 8000 for the case shown in FIG. 1(b) using a true SOI power of 10 dB.
Figure 4:
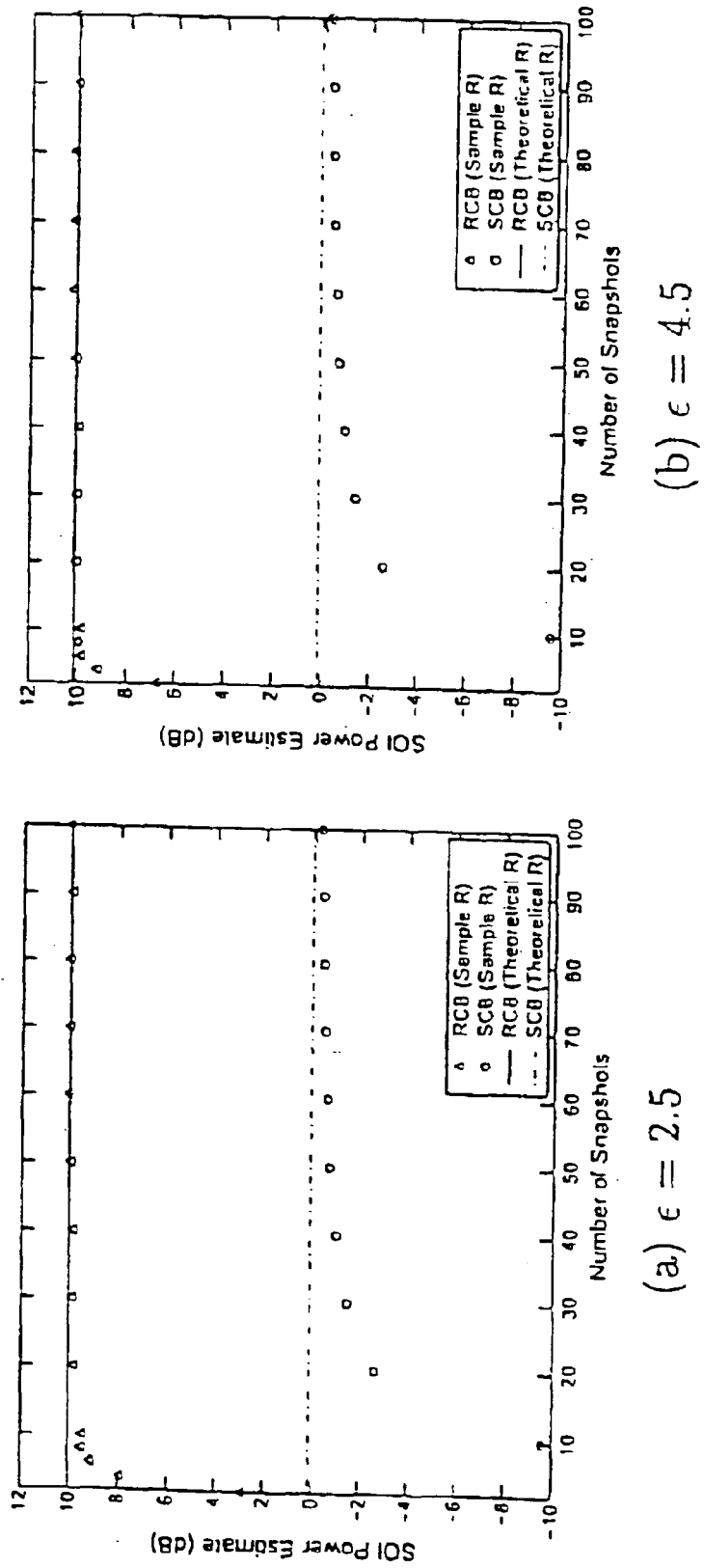
FIG. 4(a) and (b) are plots of $\sigma_0^2$ and $\hat{\sigma}_0^2$ for the advanced RCB and SCB using the theoretical array covariance R, as well as the estimated array covariance $\hat{R}$, versus the number of snapshots N for a true SOI power of 10 db and $\epsilon_0$=3.2460 (corresponding to a 2 degree steering angle error), for $\epsilon$=2.5 and $\epsilon$=4.5, respectively.
Figure 5:
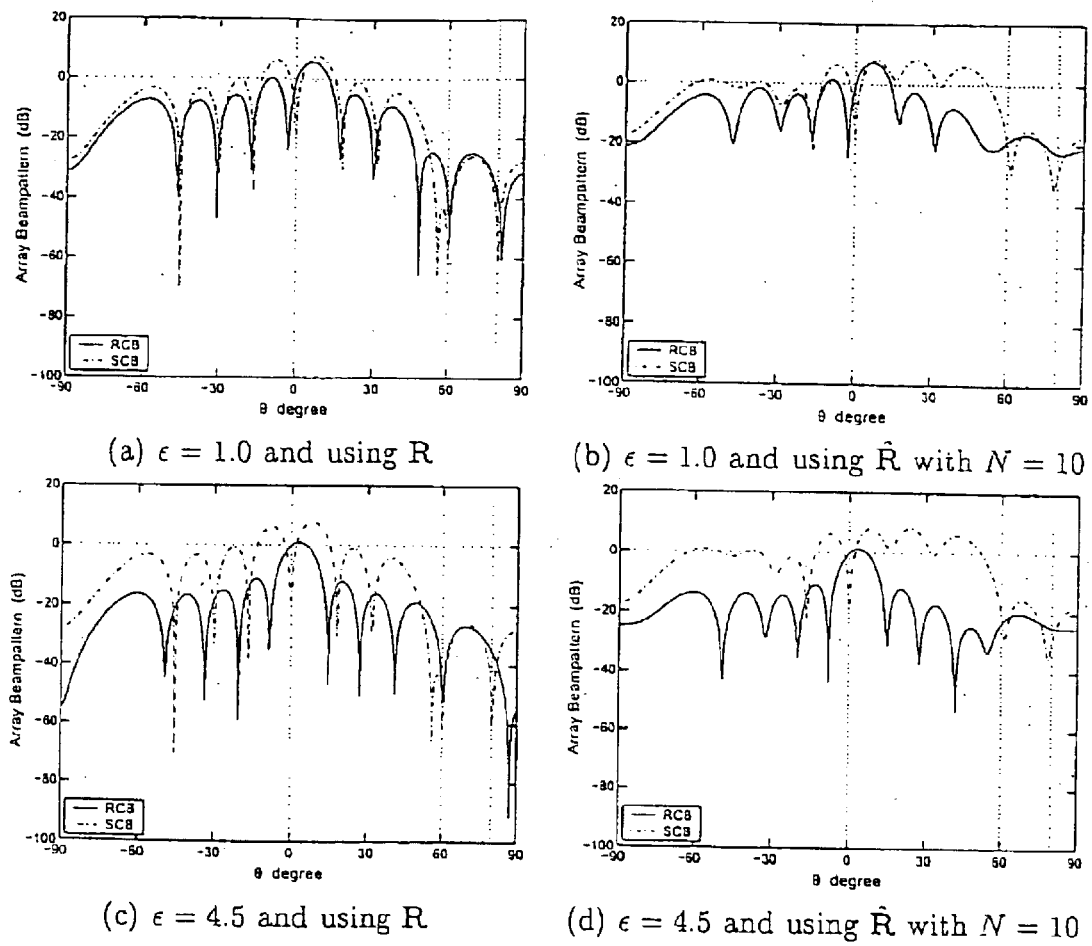
FIG. 5 shows comparisons of beampatterns for the SCB and advanced RCB for $\epsilon$=1.0 for R in 5(a), $\epsilon$=1.0 for $\hat{R}$ with N=10 in 5(b), $\epsilon$=4.5 for R in 5(c), $\epsilon$=4.5 for $\hat{R}$ with N=10 in 5(d), all for a true SOI power of 10 dB and $\epsilon_0$=3.2460 (corresponding to a 2 degree steering angle error).

FIG. 4 and 5 are similar to FIGS. 2 and 3, respectively, except that now a steering angle error of $\Delta = 2°$ and accordingly $\epsilon_0 = 3.2460$ is considered. FIG. 4 shows that even a relatively small 2 degree $\Delta$ can cause a significant degradation of the SCB performance as evidenced by a large error in the estimation of the power of the SOI. The SCB method considers the SOI to be interference and suppresses it resulting in a power measurement which is significantly below the 10 dB SOI power. On the other hand, the SOI is preserved by the advanced RCB and the performance of $\hat{\sigma}_0^2$ obtained via the invention is quite good for a wide range of values of $\epsilon$. Note that the advanced RCB also has a smaller "noise gain" than the SCB.

FIG. 5 shows comparisons of beampatterns for the SCB and advanced RCB when $\epsilon = 1.0$ for R in 5(a), $\epsilon = 1.0$ for $\hat{R}$ with N=10 in 5(b), $\epsilon = 4.5$ for R in 5(c), $\epsilon = 4.5$ for $\hat{R}$ with N=10 in 5(d) for a true SOI power of 10 db and $\epsilon_0 = 3.2460$ (corresponding to a 2 degree steering angle error). Although the advanced RCB is seen as being relatively insensitive to steering vector error and a small N, the SCB demonstrates sensitivity to steering vector error and $\hat{R}$ when using a relatively small N (FIG. 5(b) and (d)).

Figure 6:
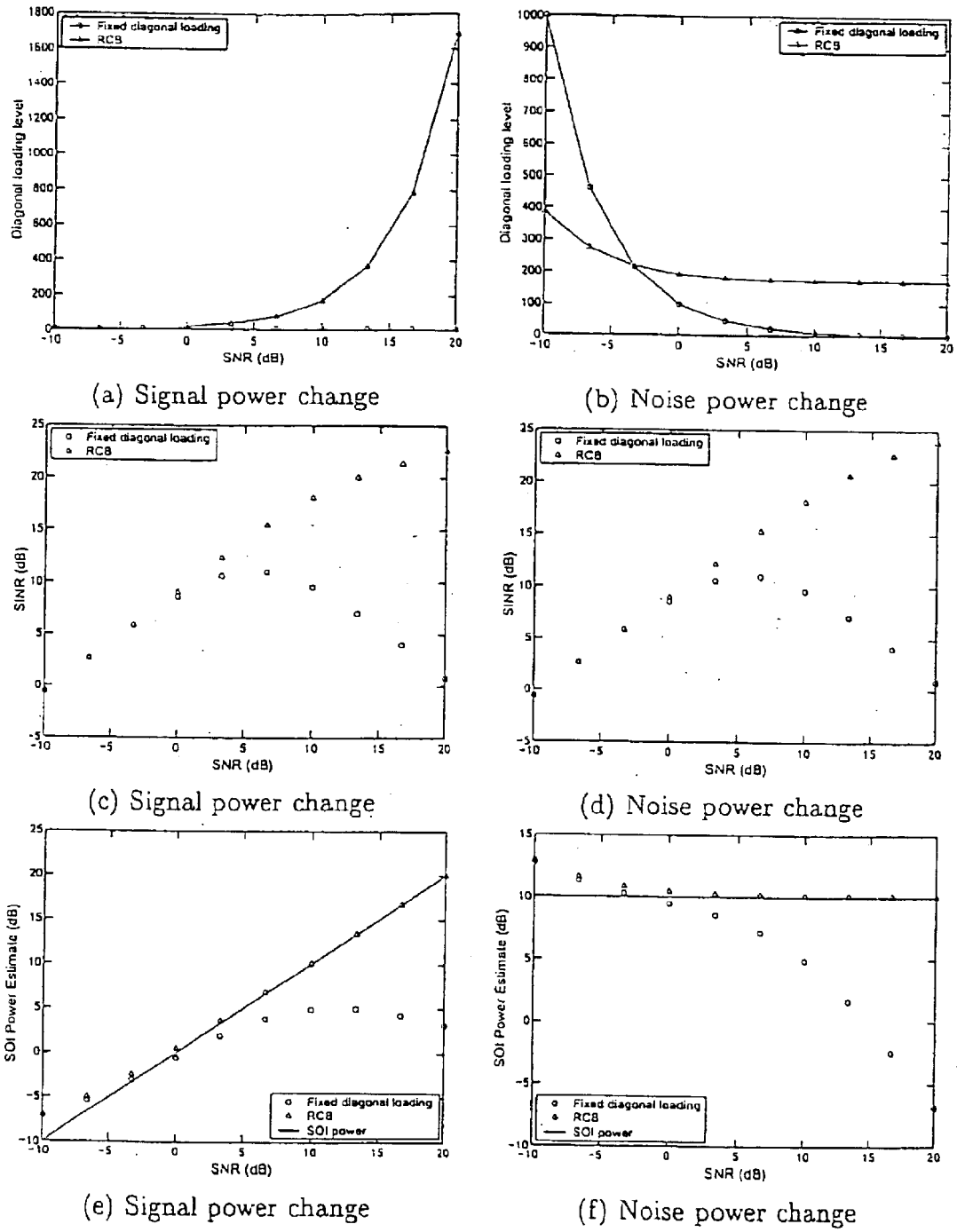
FIGS. 6(a) and 6(b) show the diagonal loading levels of the advanced RCB as a function of the SNR.
FIGS. 6(c) and 6(d) show SINRS of the advanced RCB and the fixed diagonal loading level approach.
FIGS. 6(e) and 6(f) show the corresponding SOI power estimates, all as functions of the SNR. In each case, $\epsilon$=4.5 and there is a 2 degree steering angle error.

FIGS. 6(a) and 6(b) show the diagonal loading levels of the advanced RCB as a function of the SNR, FIGS. 6(c) and 6(d) show the SINRs of the advanced RCB and the fixed diagonal loading level approach, and FIGS. 6(e) and 6(f) show the corresponding SOI power estimates, all as functions of the SNR. In each case, $\epsilon = 4.5$ and there is a 2 degree steering angle error. The fixed diagonal loading level was chosen equal to 10 times the noise power (assuming the knowledge of the noise power). This is similar to the same case shown in FIG. 5(d), except it is now assumed that R is available and that the SNR can be varied by changing the SOI or noise power.

For FIGS. 6(a), 6(c) and 6(e), the noise power is fixed at 0 dB and the SOI power is varied between −10 dB and 20 dB. For FIGS. 6(b), 6(d) and 6(f), the SOI power is fixed at 10 dB and the noise power is varied between −10 dB and 20 dB. FIGS. 6(a) and 6(b) demonstrate that the advanced RCB adjusts the diagonal loading level adaptively as the SNR changes. FIG. 6(c) and (d) demonstrate the SINR is maintained by the advanced RCB throughout the SNR range considered but the fixed diagonal loading approach degrades at SNR levels above about 5 dB. Similarly, FIG. 6(e) and (f) demonstrate the accuracy of the SOI power estimate is maintained by the advanced RCB throughout the SNR range considered but the fixed diagonal loading approach degrades at SNR levels above about 5 dB. Thus, the advanced RCB significantly outperforms the fixed diagonal loading level approach when the SNR is medium or high.

Figure 7:
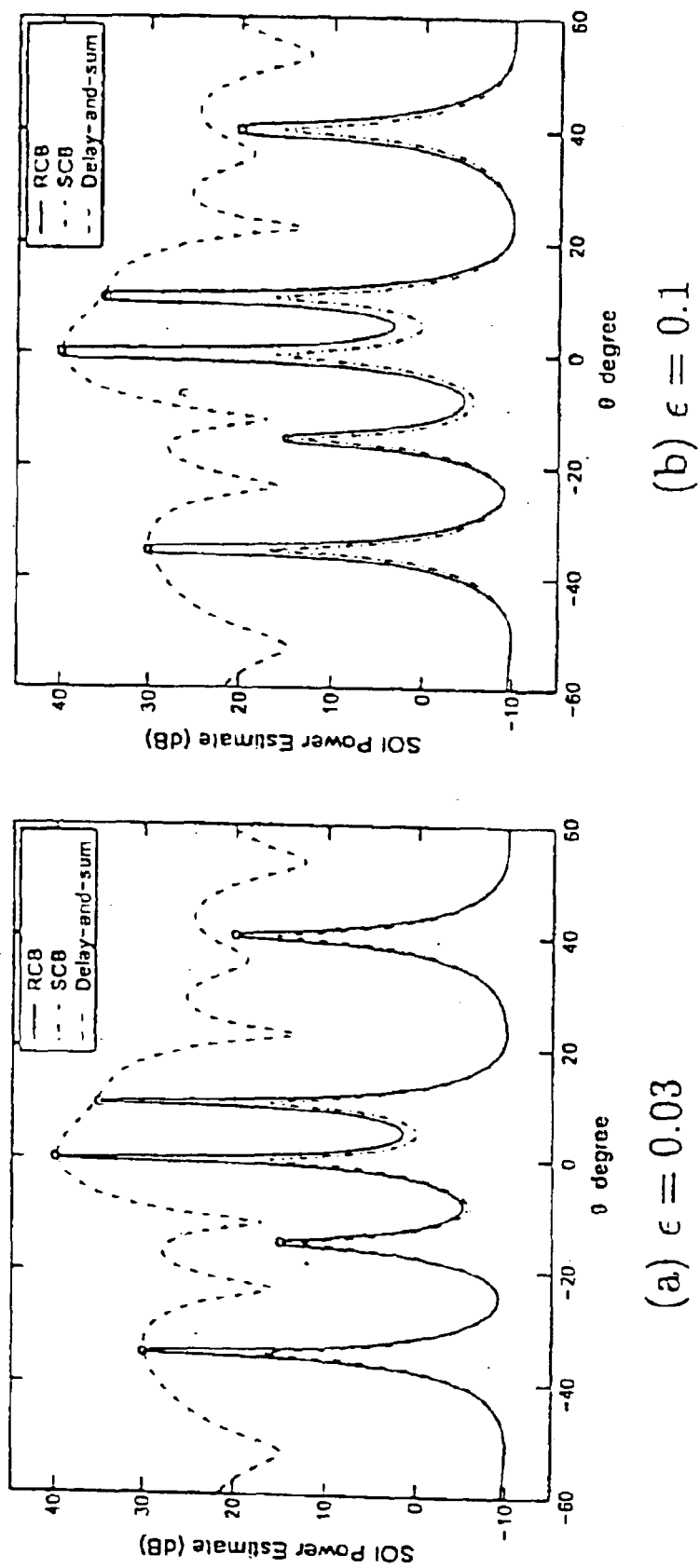
FIG. 7(a) and (b) illustrate power estimates vs. the steering direction for $\epsilon$=0.03 and 0.1, respectively, for five separately spaced signals, with $\epsilon$=0.05.

FIG. 7(a) and (b) illustrate power estimates vs the steering direction for $\epsilon = 0.03$ and 0.1, respectively, for five separately spaced signals, obtained using R, as a function of the direction angle, for $\epsilon_0 = 0.05$. Thus, it is desired to determine the incident signal power as a function of the steering direction a. It is assumed that there are five incident signals with powers of 30, 15, 40, 35, and 20 dB from directions −35°, −15°, 0°, 10°, and 40°, respectively. To simulate the array calibration error, each element of the steering vector for each incident signal is perturbed with a zero-mean circularly symmetric complex Gaussian random variable so that the squared Euclidean norm of the difference between the true steering vector and the assumed one is 0.05. The perturbing Gaussian random variables are independent of each other.

The small circles in FIG. 7(a) and (b) denote the true (direction of arrival, power)-coordinates of the five incident signals. FIGS. 7(a) and (b) also show the power estimates obtained with the data-independent beamformer using the assumed array steering vector divided by M as the weight vector. This approach is referred to as the delay-and-sum beamformer. It is noted that SCB can still give good direction of arrival estimates for the incident signals based on the peak power locations. However, the SCB estimates of the incident signal powers are way off. On the other hand, the advanced RCB provides excellent power estimates of the incident sources and can also be used to determine their directions of arrival based on the peak locations. The delay-and-sum beamformer, however, has much poorer resolution than both SCB and advanced RCB. Moreover, the sidelobes of the delay-and-sum beamformer give false peaks.

Figure 8:
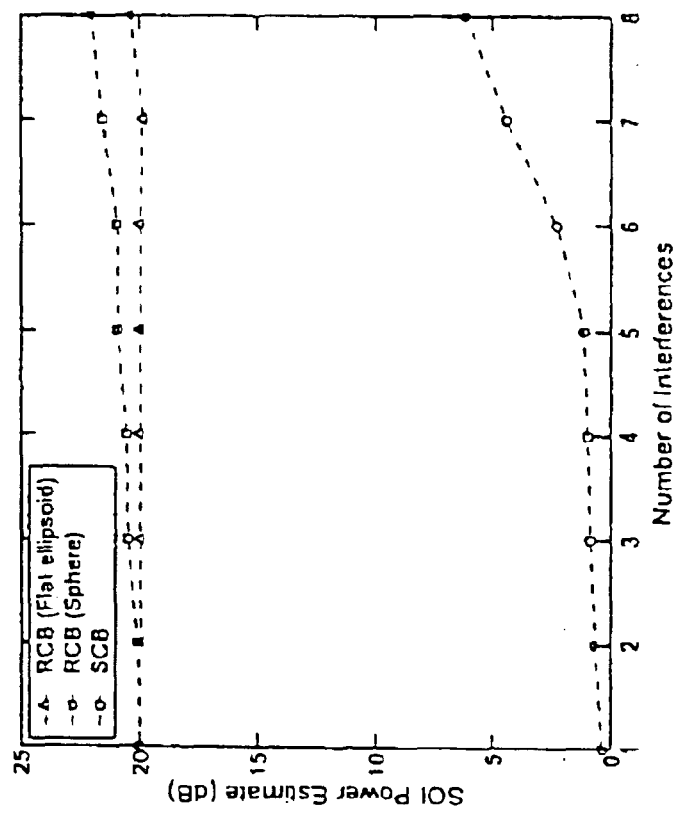
FIG. 8(a) and (b) illustrate power estimates vs. the number of interferences for the SCB and advanced RCB with a flat ellipsoidal constraint, for $\delta$=1.8 degrees and $\delta$=2.4 degrees for a true SOI power of 20 dB and $\epsilon_0$=3.1349 (corresponding to a 2 degree steering angle error).
Figure 8:
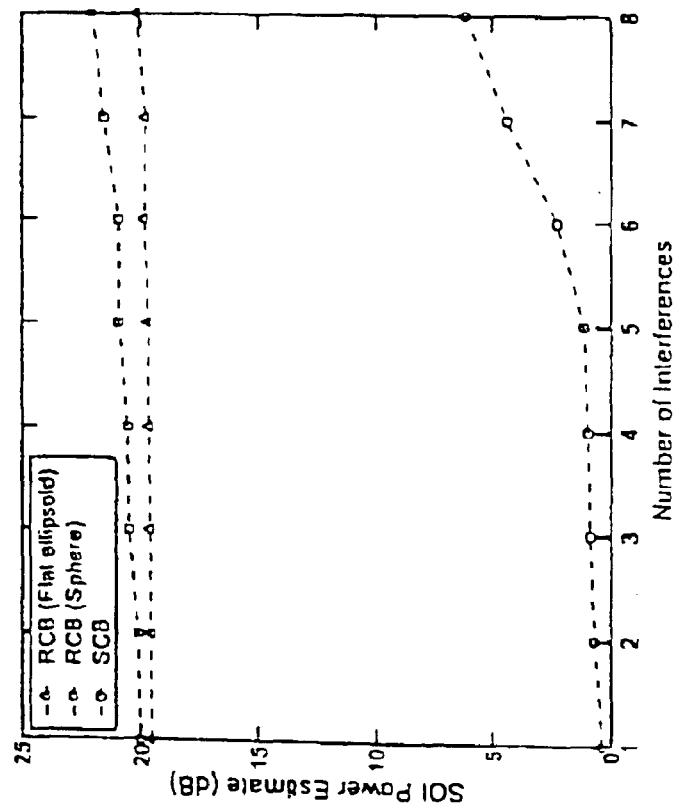
Figure 9:
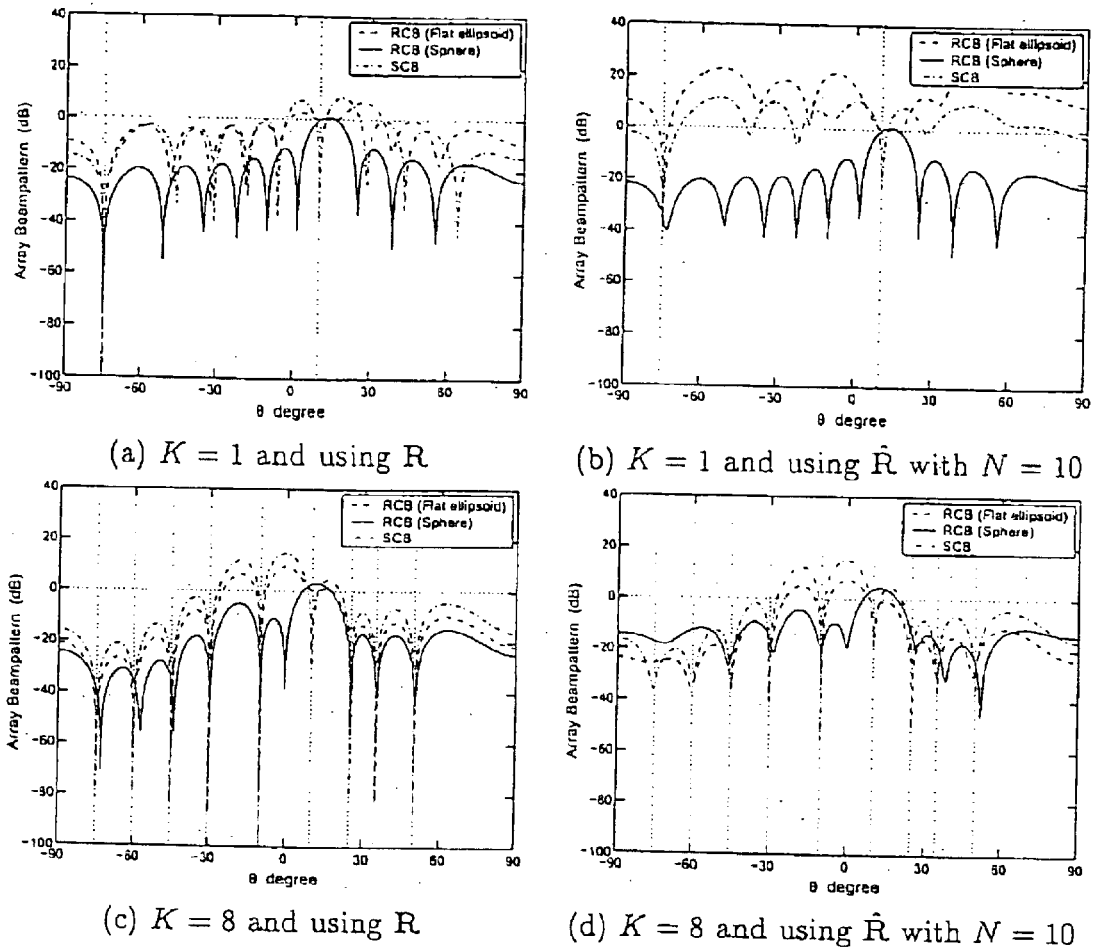
FIG. 9(a)–(d) illustrate the beampatterns of the SCB, advanced RCB (flat ellipsoid) and advanced RCB (spherical constraint), for K=1 using R in 9(a), K=1 using $\hat{R}$ with N=10 in 9(b), K=8 using R in 9(c), and K=8 using $\hat{R}$ with N=10 in 9(d), all for a true SOI power of 20 dB and $\epsilon_0$=3.1349 (corresponding to a 2 degree steering angle error).

FIG. 8(a) and (b) show SOI power estimation as a function of the number of interferences K, obtained by using the SCB, advanced RCB (with flat ellipsoidal constraint), and the more conservative advanced RCB (with spherical constraint), all based on the theoretical array covariance matrix R SOI power estimation in the presence of several strong interferences are also considered. The number of interferences were varied from K=1 to K=8. The power of SOI was $\sigma_0^2 = 20$ dB and the interference powers are $\sigma_1^2 = \ldots = \sigma_K^2 = 40$ dB. The SOI and interferences directions of arrival are $\theta_0=10°$, $\theta_1=75°$, $\theta_2=-60°$, $\theta_3=-45°$, $\theta_4=-30°$, $\theta_5=-10°$, $\theta_6=25°$, $\theta_7=35°$, $\theta_8=50°$. It was assumed that there is a look direction mismatch corresponding to $\Delta=2°$ and accordingly $\epsilon_0=3.1349$.

For the advanced RCB with flat ellipsoidal constraint, B contains two columns with the first column being $a(\theta_0+\Delta)-a(\theta_0+\Delta+\delta)$ and the second column being $a(\theta_0+\Delta)-a(\theta_0+\Delta-\delta)$. By choosing $\delta=\Delta=2°$ gives the smallest flat ellipsoid that this B can offer to include $a(\theta_0)$. However, the exact look direction mismatch is not known in practice. Thus, $\delta=1.8°$ and $\delta=2.4°$ were selected for FIGS. 8(a) and (b), respectively. For the advanced RCB with spherical constraint, the larger of $\|a(\theta_0+\Delta)-a(\theta_0+\Delta-\delta)\|^2$ and $\|a(\theta_0+\Delta)-a(\theta_0+\Delta+\delta)\|^2$ was selected. It is noted that the advanced RCB with flat ellipsoidal constraint and advanced RCB with spherical constraint perform similarly when K is small. However, the former is more accurate than the latter for large K.

FIGS. 9(a)–(d) illustrate beampatterns for the SCB and advanced RCBs using R as well as R̂ with N=10 for various K. For large K, the more conservative advanced RCB with spherical constraint amplifies the SOI while attempting to suppress the interferences. On the other hand, the advanced RCB with flat ellipsoidal constraint maintains an approximately unity gain for the SOI and provides much deeper nulls for the interferences than the advanced RCB with spherical constraint at a cost of worse noise gain. As compared to the advanced RCBs, the SCB performs poorly as it attempts to suppress the SOI. Comparing FIG. 9(b) to 9(a), it is noted that for small K and N, the advanced RCB with spherical constraint has a much better noise gain than advanced RCB with flat ellipsoidal constraint, which has a better noise gain than SCB. For FIG. 9(d), it is noted that for large K and small N, the advanced RCB with flat ellipsoidal constraint places deeper nulls at the interference angles than the more conservative advanced RCB with spherical constraint.

Figure 10:
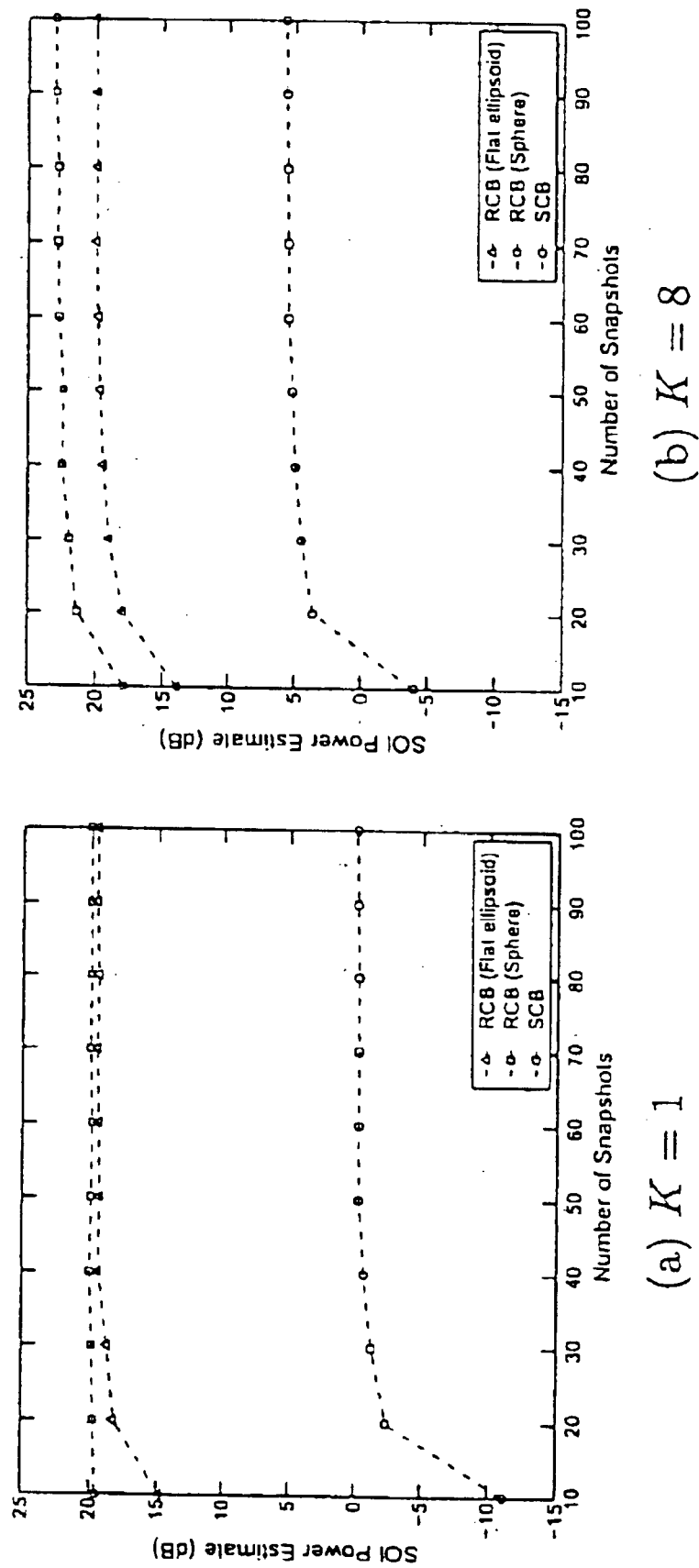
FIG. 10(a)–(b) illustrate SOI power estimates vs. the number of snapshots for the SCB, advanced RCB (flat ellipsoid) and advanced RCB (spherical constraint), using $\hat{R}$ for K=1 and K=8, respectively, for a true SOI power of 20 dB and $\epsilon_0$=3.1349 (corresponding to a 2 degree steering angle error).

FIG. 10 shows the SOI power estimates versus the number of snapshots N for K=1 and K=8 when the sample covariance matrix R̂ is used in the beamformers. It is noted that for small K, the advanced RCB with a spherical constraint converges faster than the advanced RCB with flat ellipsoidal constraint as N increases, while the latter converges faster than SCB. For large K, however, the convergence speeds of the advanced RCB with flat ellipsoidal constraint and the advanced RCB with spherical constraint are about the same as that of SCB. After convergence, the most accurate power estimate is provided by advanced RCB with flat ellipsoidal constraint.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

What is claimed is:

1. A method for enhanced Capon beamforming, comprising the steps of:
   providing a sensor array including a plurality of sensor elements, wherein an array steering vector corresponding to a signal of interest (SOI) is unknown;
   representing said array steering vector with an ellipsoidal uncertainty set;
   bounding a covariance fitting relation for said array steering vector with said uncertainty ellipsoid, and
   solving said covariance fitting relation to provide an estimate of said array steering vector ($a_0$).

2. The method of claim 1, further comprising the step of determining a power of said SOI, said step of determining power including adjustment for said estimated array steering vector ($a_0$).

3. The method of claim 2, further comprising the step of determining a direction of arrival (DOA) of said SOI from said SOI power.

4. The method of claim 1, wherein said method is used to determine a weight vector for said sensor array.

5. The method of claim 4, further comprising the step of determining a waveform of said SOI from said weight vector.

6. The method of claim 1, wherein said solving step comprises use of the Lagrange Multiplier Method.

7. The method of claim 1, wherein said ellipsoidal set is a flat ellipsoidal set.

8. The method of claim 1, wherein said sensor elements comprise antennas or ultrasound transducers.

9. A sensor-based system, comprising,
   a sensor array including a plurality of sensor elements, wherein an array steering vector corresponding to a signal of interest (SOI) is unknown, and
   a signal processor, said signal processor representing said array steering vector with an ellipsoidal uncertainty set; bounding a covariance fitting relation for said array steering vector with said uncertainty ellipsoid, and solving said covariance fitting relation to provide an estimate of said array steering vector.

10. The system of claim 10, wherein said sensor system comprises at least one selected from the group consisting of radar, cellular communications, sonar and acoustic imaging.

* * * * *